(No Model.) 4 Sheets—Sheet 1.
C. L. CLARKE.
CIRCUIT AND APPARATUS FOR ELECTRIC TEMPERATURE AND PRESSURE INDICATOR.
No. 284,382. Patented Sept. 4, 1883.
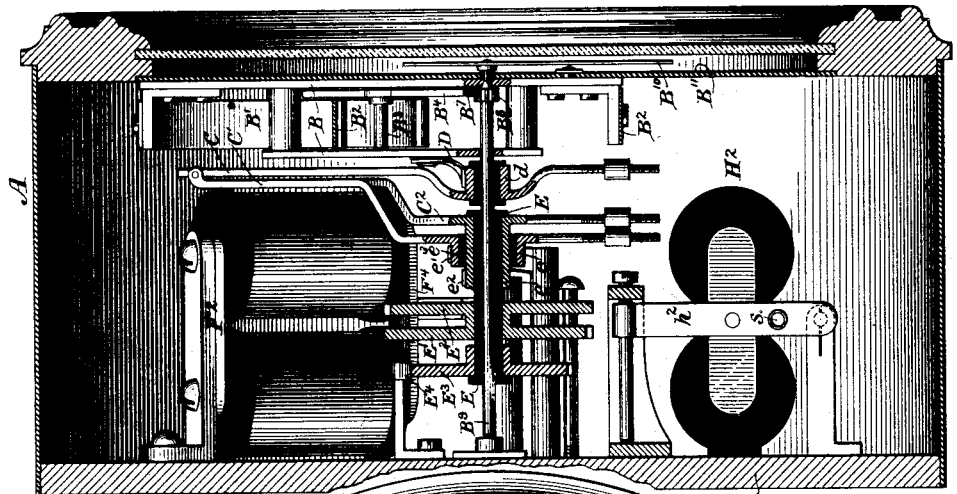
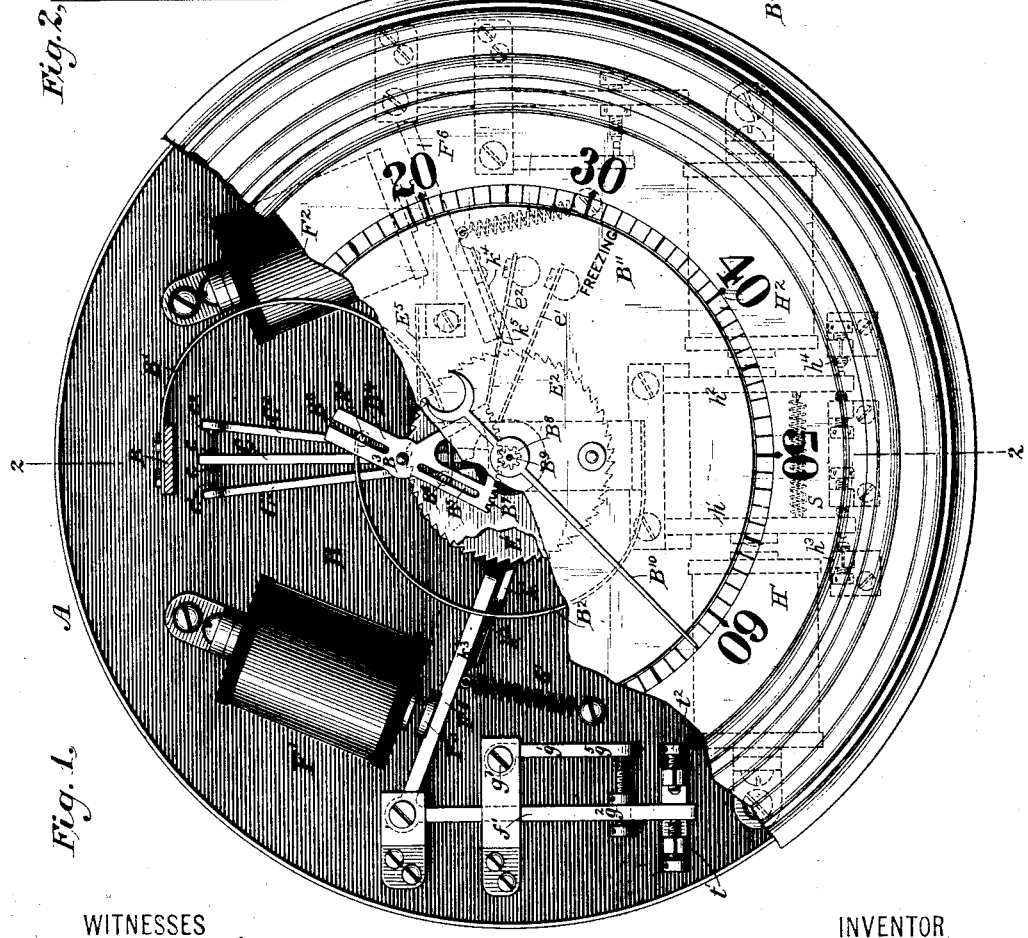
WITNESSES
Wm A. Skinkle
Geo. W. Breck.
By his Attorneys
INVENTOR
Charles L. Clarke,
Pope Edgecomb & Butler

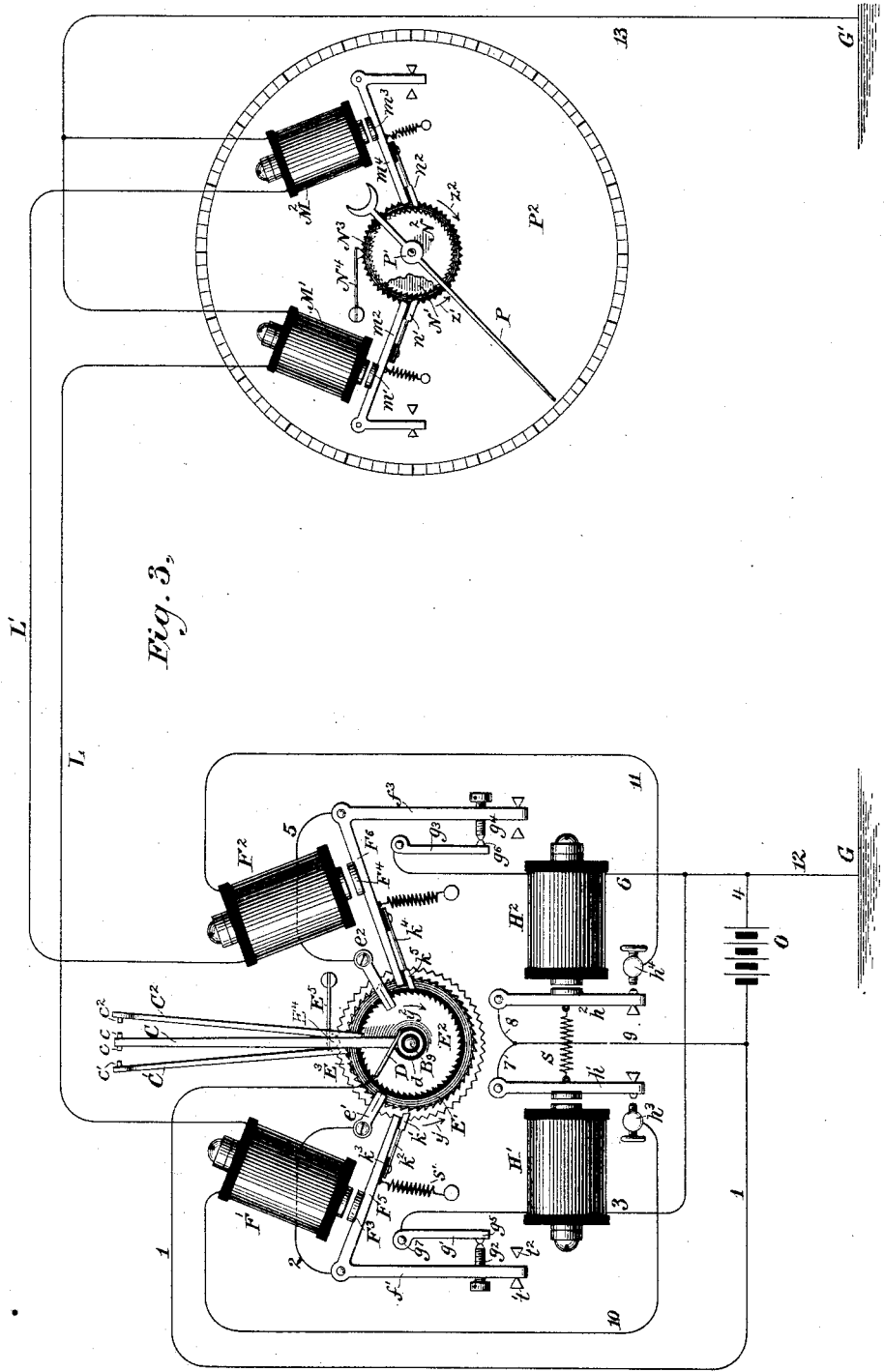

(No Model.) C. L. CLARKE. 4 Sheets—Sheet 3.
CIRCUIT AND APPARATUS FOR ELECTRIC TEMPERATURE AND
PRESSURE INDICATOR.
No. 284,382. Patented Sept. 4, 1883.
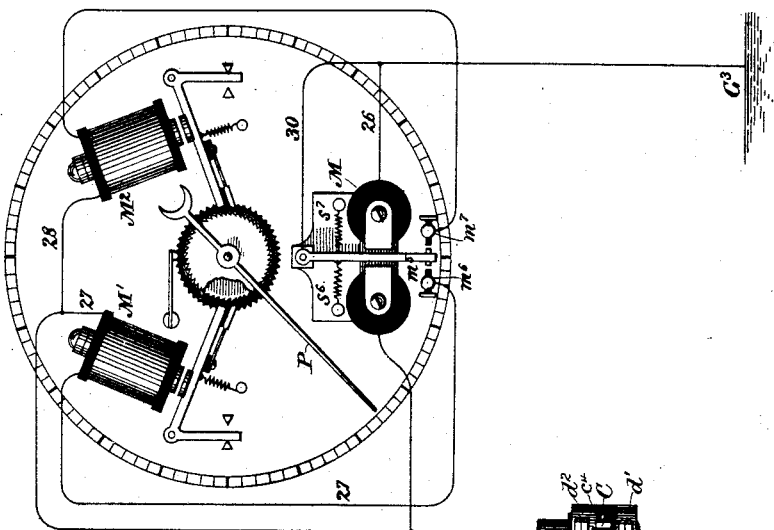
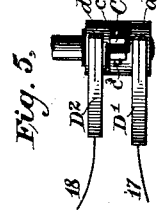
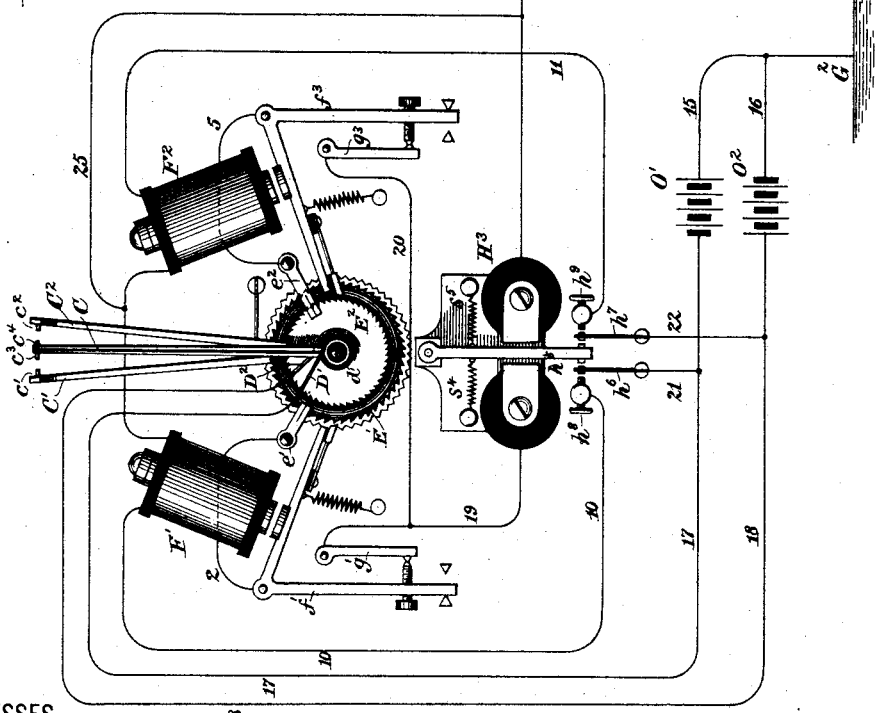
WITNESSES
Wm A. Skinkle
Geo W. Breck
By his Attorneys
INVENTOR
Charles L. Clarke,
Pope Edgecomb & Butler

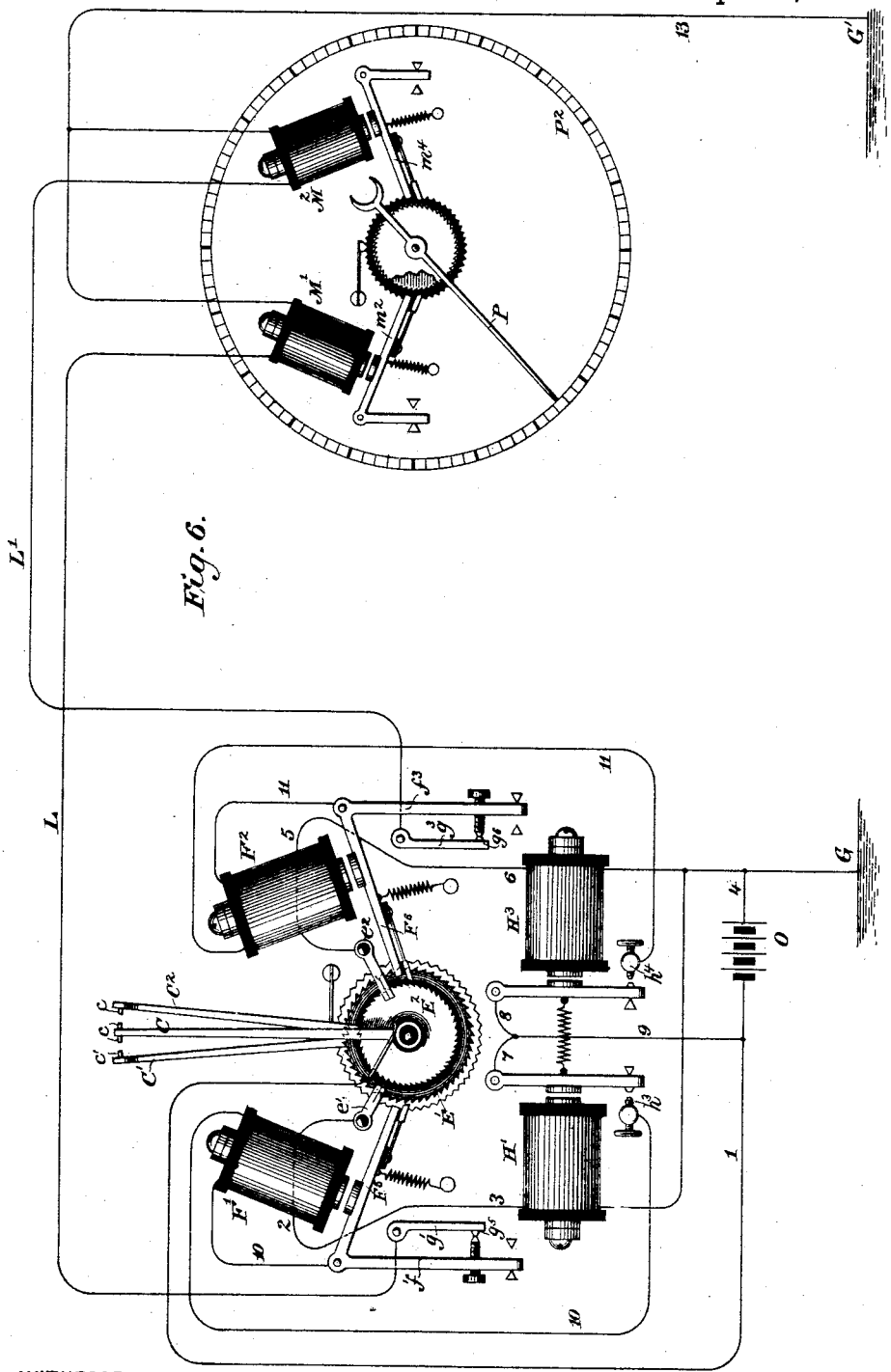

UNITED STATES PATENT OFFICE.

CHARLES L. CLARKE, OF NEW YORK, N. Y., ASSIGNOR TO ROBERT HEWITT, JR., OF SAME PLACE.

CIRCUIT AND APPARATUS FOR ELECTRIC TEMPERATURE AND PRESSURE INDICATORS.

SPECIFICATION forming part of Letters Patent No. 284,382, dated September 4, 1883.

Application filed January 19, 1883. (No model.)

*To all whom it may concern:*

Be it known that I, CHARLES L. CLARKE, a citizen of the United States, and a resident of the city of New York, in the county and State of New York, have invented certain new and useful Improvements in Circuits and Apparatus for Electric Temperature and Pressure Indicators, of which the following is a specification.

The object of my invention is to provide means for automatically indicating at any required station, through the instrumentality of electric currents, variations of temperature or of pressure at a distant station.

The invention consists in combining with any suitable instrument adapted to respond to variations of temperature or in pressure a circuit-closing device constructed to transmit to a recording or indicating apparatus electric impulses of a character and frequency dependent upon the direction, rapidity, and amplitude of the movement of the thermostatic element or the pressure-indicating device.

The invention also consists in applying to the apparatus for transmitting the impulses in their proper sequence a device whereby the circuit through which the impulses are transmitted to the recording-instrument is normally interrupted, but allowing the connections of the same to be momentarily completed whenever the movement of the transmitting device requires that an impulse of any character should be transmitted for actuating the recording device accordingly. The organization of apparatus which I employ for this purpose will be more particularly described in connection with the accompanying drawings, in which—

Figure 1 is a front elevation of a transmitting device embodying my invention as applied to a thermostatic device, and Fig. 2 a side elevation of the same. Fig. 3 is a theoretical diagram illustrating the arrangement of circuits in connection with the recording or indicating device. Figs. 4 and 6 illustrate certain modifications in the construction and arrangement of the apparatus and circuits, and Fig. 5 illustrates certain details of construction.

Referring to the figures, A represents a suitable case for inclosing, and B a frame for supporting, the various parts of the thermostatic and the impulse-transmitting devices. The thermostatic instrument which I prefer to employ consists of two curved bimetallic strips, $B'$ and $B^2$, each of which is secured at the outer extremity to the frame B. The inner extremities of these strips extend in opposite directions upon opposite sides of the trunnion or arbor $B^3$ of a double-armed lever, $B^4$. In each arm of the lever $B^4$ is formed a longitudinal groove or slot, $B^5$, through which slots project two pins, $B^6$ $B^6$, respectively carried at the free ends of the thermostatic strips $B'$ and $B^2$. Upon one arm of the lever $B^4$ is formed a toothed segment, $B^7$, concentric with the arbor $B^3$. The teeth of this segment engage a pinion, $B^8$, formed upon an arbor, $B^9$, upon which is carried a pointer or index, $B^{10}$, for indicating upon a dial, $B^{11}$, the movements of the thermostatic strips. The operation of this portion of the instrument is as follows: Any change of temperature will cause the thermostatic strips to assume a more or less curved position, and their free ends will thereby be carried simultaneously in opposite directions, thus causing the lever $B^4$ to be moved in one direction or the other through the agency of the pins $B^6$ and slots $B^5$. This motion is communicated by the segment $B^7$ and pinion $B^8$ to the arbor $B^9$ and index $B^{10}$. This portion of the mechanism, however, is well known, and I do not herein make any claim thereto.

Upon the arbor $B^9$, and moving therewith, is a circuit-closing arm, C, carrying at its extremity two contact-points, $c$ $c$. The arm C is preferably insulated from the arbor $B^9$ by an intervening ring or sleeve of hard rubber or other suitable non-conducting material. An annular lug, $d$, formed upon the arm C and in electrical connection with the points $c$, encircles the arbor $B^9$, and against this lug impinges a contact-brush, D. The function of the arm C is to close an electric circuit when moved through a predetermined distance by the action of the thermostatic strips. To accomplish this end two contact-arms, $C'$ and $C^2$, are mounted upon the insulating-sleeve E, surrounding a portion of the arbor $B^9$. The arm $C^2$ is secured directly to the sleeve E by means of a collar or annular lug, $e$, and the arm $C'$ is in like manner mounted upon an insulating-sleeve, $e^3$, surrounding the lug $e$ of the arm $C^2$. At the extremities of these arms are two contact-points, $c'$ and $c^2$, respectively situated upon opposite sides of the contact-arm C and in the same plane with the contact-points $c$. The contact-points $c'$ and $c^2$ are, moreover, in electrical connection through their respective arms and annular lugs $e$ upon their pivoted extremities with two contact-brushes, $e'$ and $e^2$, respectively. These brushes are normally placed in electrical connection through two relay-magnets with one pole of a battery, the opposite pole of which is in electrical connection with the contact-points $c$ $c$. The brush $e'$ is normally in electrical connection, through a conductor, 2, a movable armature-lever, $f'$, and pendent contact-arm $g'$, (hereinafter to be described,) and conductors 3 and 4, with one pole of a battery, O. The contact-brush $e^2$ is likewise connected, through a conductor, 5, armature-lever $f^3$, and pendent contact-arm $g^3$, which are counterparts of the lever $f'$ and arm $g'$, and conductors 6 and 4, with the same pole of the battery O. The opposite pole of this battery is connected through a conductor, 1, with the contact-brush D, and thus with the contact-points $c$. When, therefore, the arm C is moved into contact with either of the arms $C'$ or $C^2$, the circuit of the battery O will be closed through the corresponding system of conductors. The closing of this circuit serves both to transmit an impulse over one or the other of two main-line conductors, L or L', leading to a distant station, accordingly as the contact is made with one or the other of the two arms $C'$ or $C^2$, and immediately acts to move the arm $C'$ or $C^2$, as the case may be, out of contact with the arm C, and the other arm an equal distance in the same direction. The first of these ends is attained by including in the conductors 3 and 6, respectively, two electro-magnets, H' and H², the armature-levers $h'$ and $h^2$ of which are respectively connected by conductors 7 and 9 and 8 and 9 with the pole of the battery O, which is connected with the contact-arm C. The armature-levers $h'$ and $h^2$ are respectively provided with front contact-stops, $h^3$ and $h^4$, from which they are normally held away by a retractile spring, S, uniting the two. The stops $h^3$ and $h^4$ are respectively electrically connected by the conductors 10 and 11 with the main lines L and L'. These electro-magnets act thus as relays to transmit impulses to the distant station whenever the circuit of the battery O is closed through one or the other of the arms $C'$ or $C^2$.

The second object—namely, that of moving the contact-arms $C'$ and $C^2$ correlatively with the circuit-closing arm C—is accomplished through the agency of two electro-magnets, F' and F², respectively included in the conductors 10 and 11, leading from the contact-stops $h^3$ and $h^4$ to the main lines L and L'. The electro-magnets F' and F² are respectively provided with armatures $F^3$ and $F^4$, mounted upon suitable levers, $F^5$ and $F^6$, carrying the extensions $f'$ and $f^3$, before referred to. The armature-lever $F^5$ carries at its extremity a pawl, $k'$, supported upon a flexible spring, $k^2$, and preferably insulated from the lever by an intervening block, $k^3$, of non-conducting material. This pawl extends toward the periphery of a ratchet-wheel, E', rigidly mounted upon but insulated from the sleeve E. The teeth of this wheel are inclined in such a manner as to allow the pawl to slide freely over them when the armature-lever $F^5$ is drawn toward its electro-magnet. When, however, the electro-magnet is demagnetized and the lever is being drawn away from its poles by a retractile spring, $s'$, the pawl will engage one of the teeth of the ratchet-wheel and cause it to be turned in the direction indicated by the arrow $y'$ through a portion of a revolution determined by the amplitude of the vibration of the armature-lever. This is determined by suitable adjusting-stops, $t'$ and $t^2$, applied to the extremity of the extension $f'$. In practice I prefer to adjust the movements in such a manner that the wheel E' will be revolved through the distance occupied by one of its teeth by each vibration of the armature-lever.

It will be evident from the above explanation that through the influence of successive impulses transmitted through the conductor 10 upon the main line L the ratchet-wheel E', and consequently the sleeve E, carrying the contact-arms $C'$ and $C^2$, may be revolved in the direction indicated by the arrow $y'$. As already stated, such an impulse will be transmitted whenever the circuit-closing arm C is placed, by the action of the thermostat, in electrical connection with the contact-arm $C'$. The movement, however, will not be imparted to the ratchet-wheel E' and arm C' until the cessation of the impulse so transmitted and the consequent retraction of the armature-lever $F^5$.

For the purpose of interrupting the circuit at the relay contact-point $h^3$ when the electric impulse shall have accomplished its several objects—namely, that of vitalizing the electro-magnet F' and actuating its armature-lever so that the pawl $k'$ shall engage a tooth upon the ratchet-wheel E', and also of actuating the recording or indicating device at the distant station—I provide the device hereinafter described for interrupting the actuating-circuit of the relay electro-magnet H' immediately after the vitalization of the electro-magnet F'. The extension $f'$ of the armature-lever $F^5$ is provided with an adjustable contact-point, $g^2$, against the extremity of which rests, by virtue of gravity, a contact-point, $g^5$, carried upon the pendent arm $g'$, near its lower extremity. The arm $g'$ is loosely supported upon a pivot, $g^7$, in such a manner that it will normally rest against the contact-point $g^2$ with sufficient pressure to form a good electrical connection. When, however, the electro-magnet F' is vitalized, and the lever $F^5$ thereby actuated, the movement of the extension $f'$ will convey to the pendent arm $g'$ a sufficient impetus to carry it beyond the limit of the vibration of the former, and thus interrupt the connection between the points $g^2$ and $g^5$. The circuit through the relay electro-magnet will thus be broken, and the armature-lever $h'$ will be drawn away from its contact-stop $h^3$, thus interrupting the circuit through the conductor 10 and electro-magnet F'. Before the circuit is again closed by the point $g^5$ falling against the point $g^2$ the armature-lever $F^3$ will have been withdrawn from the poles of the magnet F' and the arms C' and $C^2$ carried a sufficient distance in the direction indicated by the arrow $y'$ to place the former out of contact with the arm C, and the latter at approximately the same distance from the arm C upon the opposite side.

For the purpose of operating the contact-arms C' and $C^2$ in the reverse direction when the movement of the circuit-closing arm C is in the opposite direction and toward the right, I employ a second electro-magnet, $F^2$, included in the conductor 11, and provided with an armature, $F^4$, and armature-lever $F^6$, carrying pawl $k^5$, supported upon a spring, $k^4$, which several elements are counterparts of the corresponding ones already described in connection with the arm C'. A second ratchet-wheel, $E^2$, similar to the ratchet-wheel E', is also rigidly mounted upon the sleeve E, but insulated therefrom, and constructed to be revolved by the pawl $k^5$ in the direction indicated by the arrow $y^2$ in the same general manner as the wheel E'. For this purpose the teeth of this wheel are inclined in an opposite direction from those of the wheel E'. The armature-lever $F^6$ also carries an extension, $f^3$, which is provided with a contact-point, $g^4$, and pendent arm $g^5$, carrying a contact-point, $g^6$, all similar in operation and construction to the corresponding parts employed in connection with the electro-magnet F'. Their mode of operation does not therefore require further explanation. It will now be evident that when the circuit-closing arm C has been moved through a predetermined distance—say that corresponding to the fraction of a revolution arbitrarily chosen to indicate a degree of temperature upon the dial $B^{11}$—an electric impulse will be transmitted from the battery O upon one or the other of the two main-line conductors L' and L, accordingly as the arm C is actuated toward the right or left. At the transmitting-station the apparatus will immediately operate to interrupt the circuit and readjust the contact-arms to the new position of the circuit-closing arm by moving them simultaneously in the direction of the motion of the latter through an arc represented by one degree. This operation is repeated for each degree or division of the dial passed over by the circuit-closing arm.

For the purpose of preventing the contact-arms from moving at other times than when actuated by one or the other of the electro-magnets F' and $F^2$, a serrated wheel, $E^3$, having the same number of teeth as each of the ratchet-wheels E' and $E^2$, is rigidly mounted upon the sleeve E and insulated therefrom. The teeth of this wheel are wedge-shaped, and against its periphery is lightly pressed a dog, $E^4$, carried upon a yielding support, $E^5$. While the pressure of this dog is sufficient to prevent an accidental displacement of the wheel and its sleeve in either direction, it will not afford any appreciable hinderance to the movement of the same under the action of either of the pawls $k'$ or $k^5$.

At the distant or indicating station I provide an index-hand, P, mounted upon an arbor, P', and constructed to be moved in either direction in front of a dial, $P^2$, correlatively with the movements of the thermostatic index $B^{10}$—a result which is effected through the agency of the following-named instrumentalities: Two electro-magnets, M' and $M^2$, are respectively included in the circuits of the main lines L and L'. After traversing the coils of these magnets the conductors L and L' are connected with the earth at G' by means of a conductor, 13. A conductor, 12, also unites the pole of the battery O not connected with the main lines with the earth at G. The electro-magnet M' is provided with an armature, $m'$, and armature-lever $m^2$, carrying a spring-pawl, $n'$, similar in construction to the pawl $k'$. This pawl is constructed to engage the teeth of a ratchet-wheel, N', while the lever $m^2$ is receding from the poles of the magnet M'. The wheel N' is rigidly mounted upon the arbor P'. At the cessation of each impulse transmitted over the line L this arbor will be turned in the direction indicated by the arrow $z'$ through the distance occupied by one of its teeth in the same general manner as described with reference to the ratchet-wheel E'. The electro-magnet $M^2$ is likewise provided with an armature, $m^3$, and armature-lever $m^4$ and spring-pawl $n^2$. A second ratchet-wheel, $N^2$, is mounted upon the arbor P' and constructed to actuate the same in the direction indicated by the arrow $z^2$ through the influence of successive impulses transmitted through the main line L' and electro-magnet $M^2$. Thus the index-hand will be moved in one direction or the other correlatively with the movements of the circuit-closing arm C, and will thus cause the temperature at the transmitting-station to be indicated by its position upon the dial $P^2$. A check-wheel, $N^3$, provided with a spring-pawl, $N^4$, similar in construction to the device employed for the same purpose at the transmitting-station, may be mounted upon the arbor P' to prevent accidental displacement of the index-hand P.

In the organization of apparatus which I have described it is necessary to employ two main-line conductors for connecting the transmitting with the receiving apparatus.

In Fig. 4 I have shown a modification of the invention whereby the apparatus is adapted to be operated by a single main-line conductor. In this organization I make use of a polarized relay for transmitting to line a current of one polarity or the other, according to the direction of motion of the thermostatic device, and at the receiving-station a second polarized relay for determining in which direction the recording device shall be actuated. In organizing the apparatus for this purpose I employ substantially the same system of thermostatic and primary circuit-closing devices as already described. Instead of a single battery O, however, I prefer to employ two batteries or battery-sections, O' and $O^2$, opposite poles of which are connected with the earth at $G^2$ by conductors 15 and 16. The remaining poles of these batteries are respectively connected through conductors 17 and 18 with two contact-brushes, D' and $D^2$. These brushes are respectively in contact with two insulated annular lugs, $d'$ and $d^2$, (see Fig. 5,) formed at the pivoted extremity of the circuit-closing arm C, and these lugs are respectively electrically connected with two insulated contact-points, $c^3$ and $c^4$, carried at the extremity of that arm. The contact-arms C' and $C^2$ are in electrical connection through the conductors 2 and 5, respectively, with the extensions $f'$ and $f^3$, respectively, as in the former instance. The pendent arms $g'$ and $g^3$, however, are electrically connected by conductors 19 and 20 through the coils of a polarized relay, $H^3$, and thus with the main line $L^2$. The armature is normally held by two springs, $s^4$ and $s^5$, midway between two contact-springs, $h^6$ and $h^7$, respectively connected by conductors 21 and 22 with the poles of the batteries O' and $O^2$, which are in electrical connection with the contact-points $c^3$ and $c^4$. Each of the springs $h^6$ and $h^7$ works against a contact-stop, as shown at $h^8$ and $h^9$, out of contact with which they are normally maintained by their own resiliency. The contact-points $h^8$ and $h^9$ are respectively connected by the conductors 10 and 11, through the coils of the electro-magnets F' and $F^2$, and by means of a conductor, 25, common to both, with the main line $L^2$. The construction of the polarized relay $H^3$ is such that an impulse from the battery O' traversing its coils to the line $L^2$ will cause the armature $h^5$ to be impelled toward the left, carrying the spring $h^6$ into contact with the stop $h^8$. A current from the battery $O^2$, however, will actuate the armature $h^5$ in the opposite direction, carrying the spring $h^7$ into contact with the stop $h^9$. Assuming the arm C to be moved toward the left and the contact-point $c^3$ to be placed in connection with the contact-point $c'$, the circuit will be closed from the battery O' through the conductor 17, contact-brush D', contact-point $c^3$, contact-arm C', contact-brush $e'$, conductor 2, extension $f'$, pendent arm $g'$, conductor 19, and polarized relay $H^3$, to the line $L^2$. The armature $h^5$ will thereupon be actuated and the spring $h^6$ be caused to impinge against the contact-stop $h^8$, thereby closing the circuit from the negative pole of the battery $O^2$ through the conductors 21 and 10, electro-magnet F', and conductor 25, to the main line $L^2$. The armature-lever $F^5$ will accordingly be actuated, and the circuit through the polarized relay $H^3$ will be interrupted by the movement of the pendent arm $g'$ in the same manner as in the organization first described. The armature $h^5$ will in consequence assume its normal position, and the circuit through the electro-magnet F' will also be interrupted. The subsequent retraction of the armature-lever $F^5$ will actuate the ratchet-wheel E' and arms C' and $C^2$, as in the former instance. When the circuit is closed by the movement of the arm C in the opposite direction—that is, toward the right hand—the operation will be precisely similar, the circuit of the battery being closed from its positive pole through the polarized relay $H^3$, and then through the electro-magnet $F^2$, causing the arms C' and $C^2$ to be moved in the corresponding direction. Thus it will be evident that negative or positive impulses will be transmitted upon the line $L^2$ to the distant station, according to the direction of motion of the arm C.

At the receiving-station I employ the same system of apparatus for actuating the indicating device as described in the former instance; but instead of connecting the main line $L^2$ through the electro-magnets M' $M^2$, a polarized relay, M, is included in the main line, which is connected with the earth at $G^3$ by a conductor, 26. The electro-magnets M' and $M^2$ are respectively included in branch conductors 27 and 28, leading from a conductor, 29, connected with the main line, to the contact-stops $m^6$ and $m^7$, respectively, of the armature $m^5$ of the polarized relay M. The armature $m^5$ is electrically connected by a conductor, 30, with the earth at $G^3$. It is normally maintained by suitable springs, $s^6$ and $s^7$, at a point midway between these contacts. A negative current, however, from the line $L^2$, traversing the coils of the polarized relay M, will cause the armature to impinge against the contact-stop $m^6$, and will thus close the branch circuit of the main line through the conductor 27 and electro-magnet M' to the contact-stop $m^6$, thence through the armature $m^5$ and conductor 30 to the earth at $G^3$. Upon the cessation of this impulse the index P will be actuated toward the right hand in a manner already sufficiently described. The effect of a positive current from the line $L^2$ will be precisely similar, with the exception that the electro-magnet $M^2$ will be vitalized and the index P will be actuated in the reverse direction.

In Fig. 6, I have shown a modification in the arrangement of the pendent arms $g'$ and $g^3$ and their attendant devices with reference to the main and local circuits, which consists in interposing the same in the main-line circuit. The line L for this purpose is connected directly with the arm $g'$, and the contact-brush $e'$ is connected through the conductor 2 with the conductor 3, leading to the electro-magnet H', while the line 10 is connected with extension $f'$ of the armature-lever $F^5$. In like manner the main line L' is connected with the pendent arm $g^3$, and the conductor 5 with the conductor 6, leading to the electro-magnet $H^3$. The conductor 11 is connected with the extension $f^3$. The operation will be essentially the same, with the exception that in this organization, the circuit of the main line being first interrupted, the discharges of the magnets F' and M' will be manifested at the point $g^5$, but, being in opposite directions, will tend to neutralize each other, and the discharge of the electro-magnet H' will be manifested at the point $c'$, whereas in the first-described organization the entire tendency of the discharges will be to manifest themselves at the points $g^5$ and $h^3$, and no discharge will occur through the more delicate point $c$.

A still further modification in the same direction as that last indicated consists in applying the pendent arms to the armature-levers $m^2$ and $m^4$ of the receiving-instrument and interrupting the main circuit in the manner last described.

I hereby disclaim, so far as this specification and these Letters Patent are concerned, all inventions which are shown, described, and claimed or to be claimed in an application relating to the same subject-matter filed by me June 18, 1883, Serial No. 98,453, and which are not specifically claimed herein.

I claim as my invention—

1. The combination, substantially as hereinbefore set forth, of a normally-open main conductor, a thermostatic device or pressure-gage, and a circuit-closing device automatically operated thereby, at one terminal of said conductor, an indicating or recording device at the other terminal of said conductor, and means, substantially such as described, for closing said main circuit, and for causing the current thus transmitted, first, to operate said indicating or recording device, and, second, to reopen said main circuit.

2. The combination, substantially as hereinbefore set forth, of a normally-open main circuit, an automatically-operated circuit-closing arm, a local circuit closed by the operation of said arm, an electro-magnet included in said local circuit, acting, while vitalized, to close said normally-open main circuit, and a second electro-magnet acting to temporarily interrupt said local circuit when said main circuit is closed.

3. The combination, substantially as hereinbefore set forth, of the normally-open main electric circuit, an automatically-operated circuit-closing arm, a local circuit closed by the operation of said arm, an electro-magnet included in said local circuit, acting, while vitalized, to close said main circuit, an electro-magnet included in the main circuit, an armature and armature-lever actuated by the last-named electro-magnet, and a pendent arm actuated through the movement of said armature-lever to temporarily interrupt said local circuit.

4. The combination, substantially as hereinbefore set forth, of an automatically-operated circuit-closing arm, a contact-arm extending in proximity to said circuit-closing arm, an electro-magnet, its armature and armature-lever, means, substantially such as described, for successively closing and interrupting an electric circuit through the coils of said electro-magnet through the instrumentality of said circuit-closing and contact arms, a pawl carried upon said armature-lever, and a ratchet-wheel engaged by said pawl for moving said contact-arm out of contact with said circuit-closing arm when the circuit through said electro-magnet is interrupted.

5. The combination, substantially as hereinbefore set forth, of an electro-magnet, its armature and armature-lever, a relay-magnet for closing a circuit through said electro-magnet, and a pendent arm actuated by the movement of said armature-lever, to interrupt the circuit through said relay-magnet when said electro-magnet is vitalized.

6. The combination, substantially as hereinbefore set forth, of a circuit-closing arm automatically revolved in either direction, two contact-arms, one adjacent to each side of said circuit-closing arm, means, substantially such as described, for transmitting electric impulses to a distant station correlatively with the movements of said circuit-closing arm, and means, substantially such as described, for revolving both of said contact-arms in the direction of the motion of said circuit-closing arm when said impulse has been transmitted.

7. The hereinbefore-described method of automatically closing and interrupting an electric circuit, which consists in automatically and successively completing said electric circuit at a given point, temporarily interrupting said circuit at a second point, and thereby causing said circuit to be interrupted at the first-named point before it is again closed at the second point.

8. The combination, substantially as hereinbefore set forth, of an electro-magnet, its armature and armature-lever, a relay-magnet for closing a circuit through said electro-magnet, an armature, armature-lever, and contact-stop applied to said relay-magnet, a flexible spring intervening between the last-named armature-lever and the contact-stop, and a pendent arm actuated by the movement of the first-named armature to interrupt the circuit through said relay-magnet when said electro-magnet is vitalized.

9. The combination, substantially as hereinbefore set forth, of a shaft or arbor capable of rotation in either direction, two pawls or pallets, one for imparting a direct and the other a retrograde movement to said shaft or arbor, two electro-magnets included in separate circuits for actuating said pawls or pallets, respectively, and a device actuated by said shaft or arbor, whereby when the same is moved in either direction by the action of one or the other of said electro-magnets the electric circuit of the actuating electro-magnet will be immediately broken.

10. The combination, substantially as hereinbefore set forth, of a shaft or arbor capable of rotation in either direction, two pawls or pallets, one for imparting a direct and the other a retrograde movement to said shaft or arbor, two electro-magnets in separate circuits, for actuating said pawls or pallets, respectively, a device actuated by said shaft or arbor, whereby when the same is moved in either direction by the action of one or the other of said electro-magnets the electric circuit of said actuated electro-magnet will be immediately broken, and a circuit-closing arm normally held in equilibrium between two forces, one or both of which may be variable, whereby said circuit is completed or restored through one or the other of said electro-magnets, according to the direction of the resultant force acting upon said circuit-closing arm.

In testimony whereof I have hereunto subscribed my name this 9th day of January, A. D. 1883.

CHAS. L. CLARKE.

Witnesses:
DANIEL W. EDGECOMB,
CHARLES A. TERRY.